Sept. 6, 1932.  N. A. HALLWOOD  1,875,809
SCALE
Original Filed Sept. 27, 1926  5 Sheets-Sheet 3
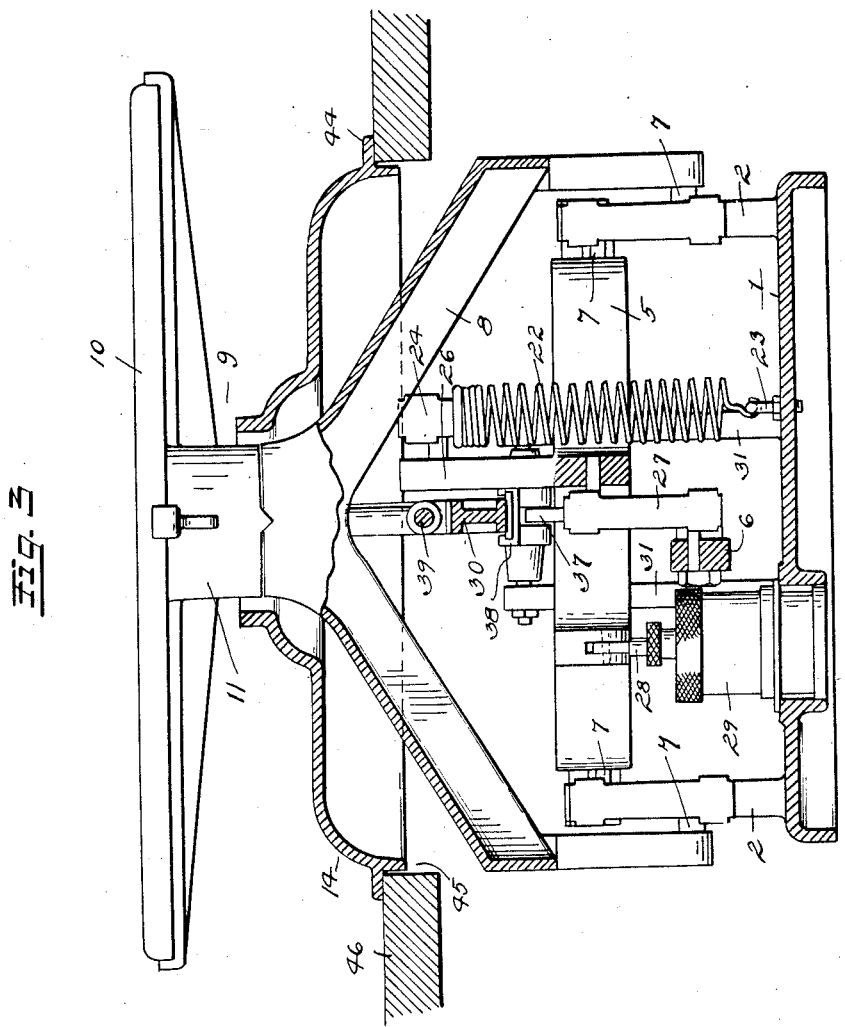
Inventor
N. A. Hallwood
By
Attorney

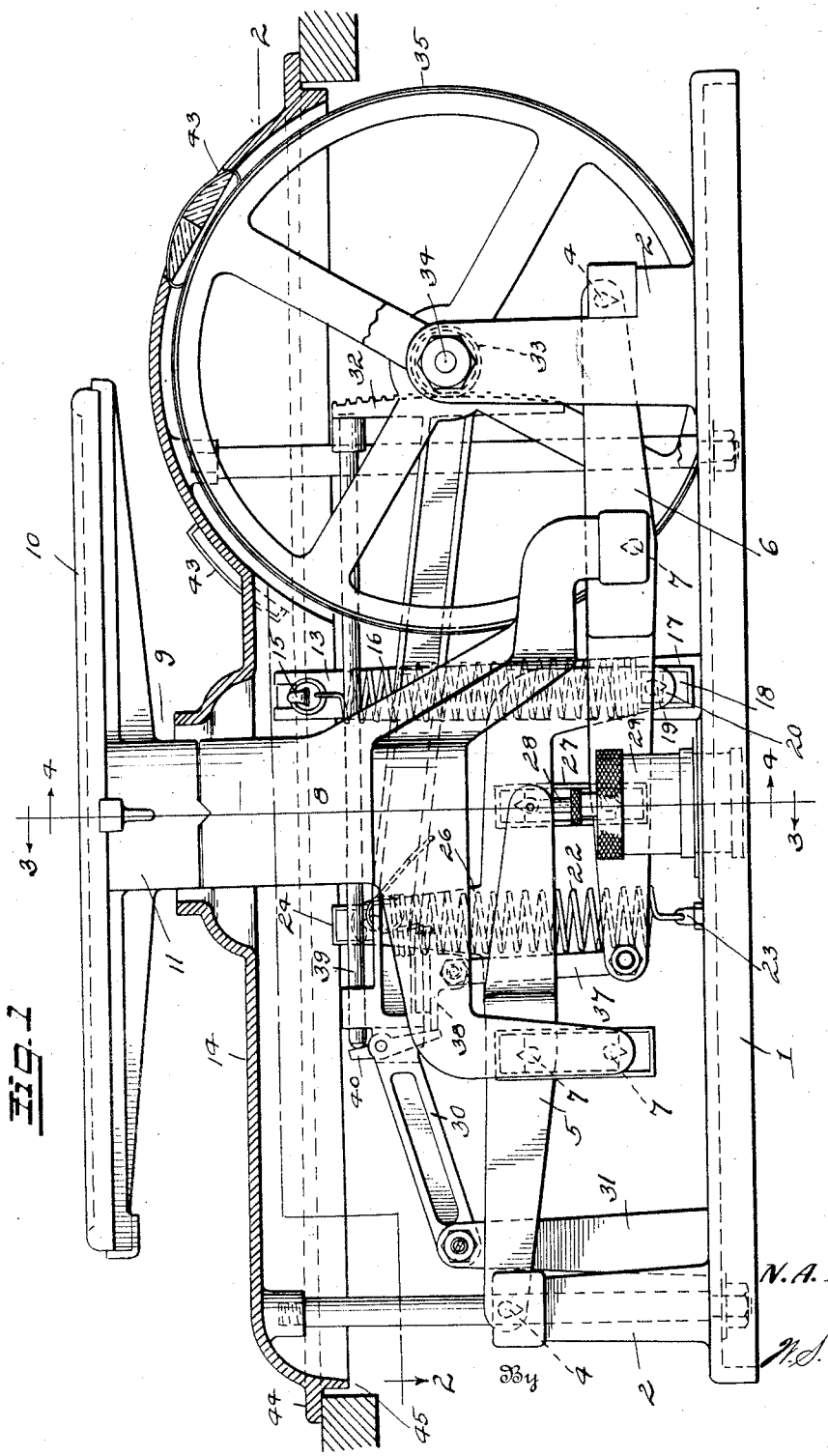

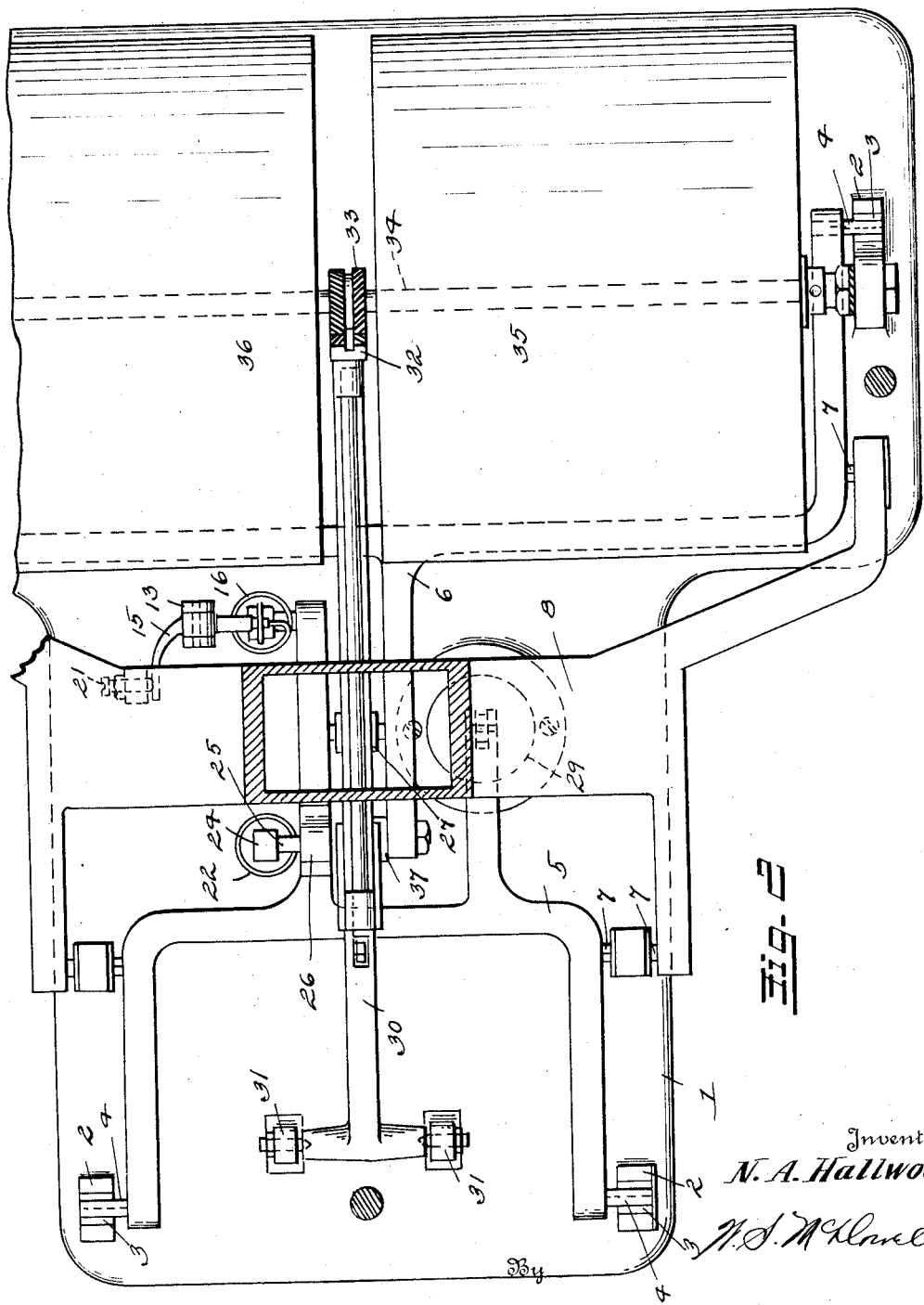

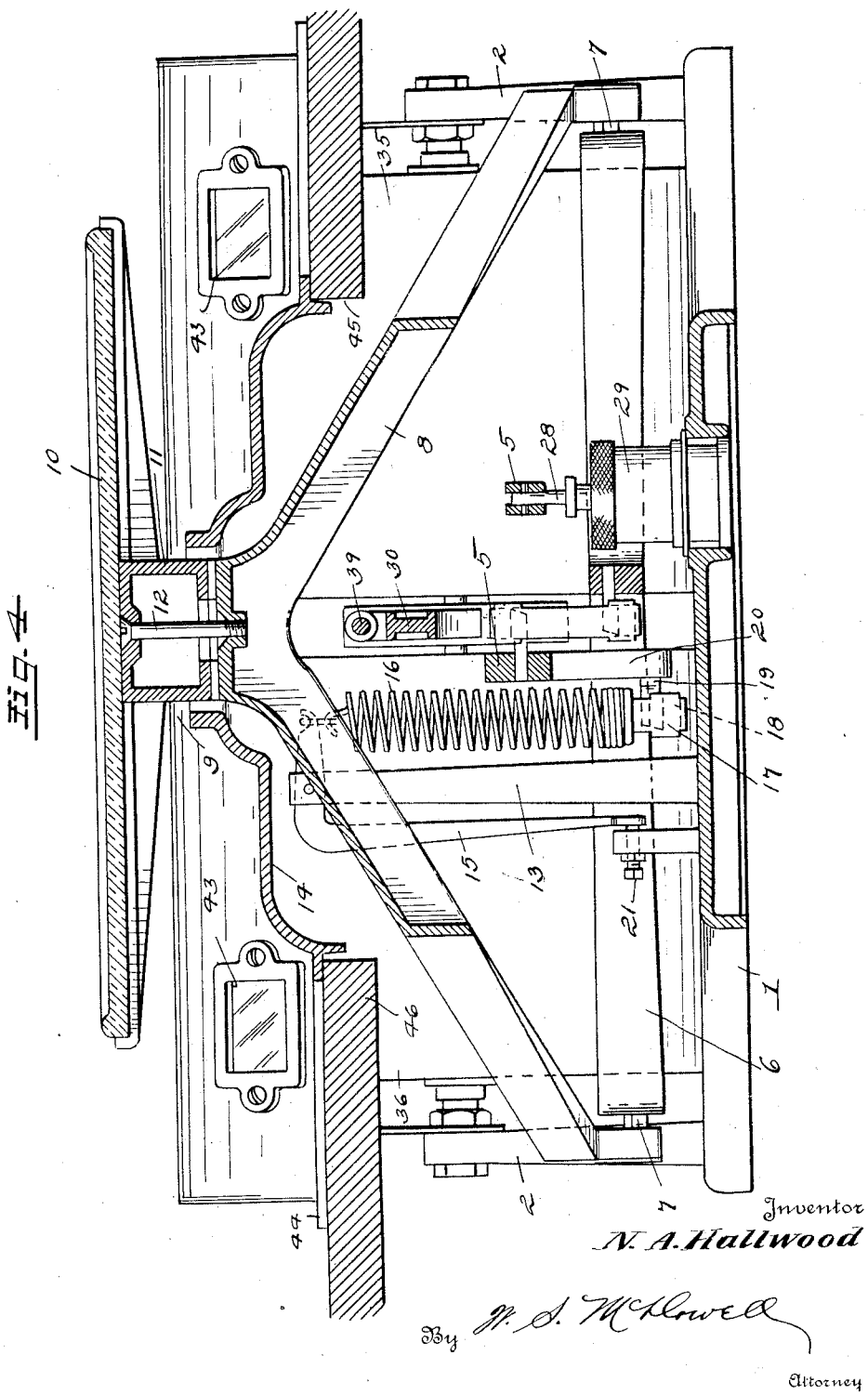

Sept. 6, 1932.   N. A. HALLWOOD   1,875,809
SCALE
Original Filed Sept. 27, 1926   5 Sheets-Sheet 5
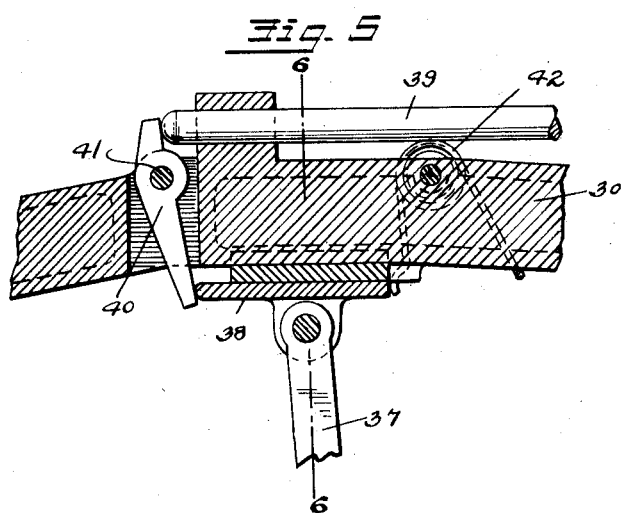
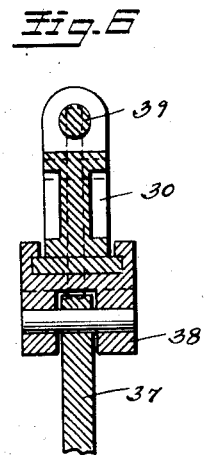
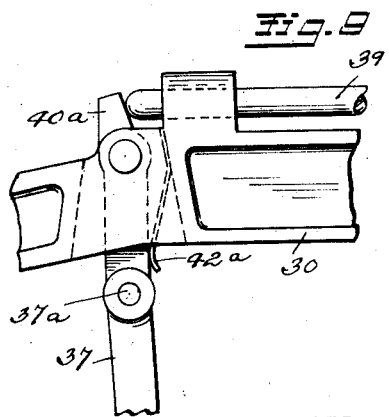
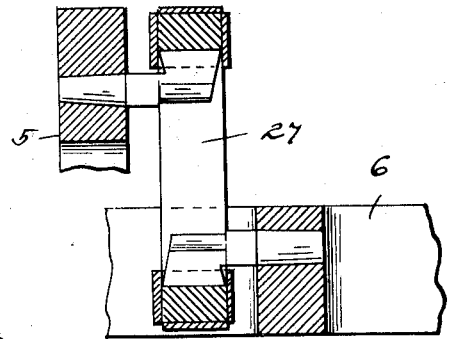
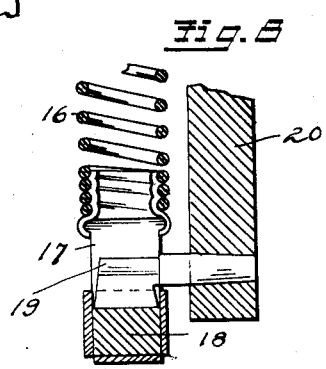
Inventor
N. A. Hallwood
By
Attorney Patented Sept. 6, 1932

1,875,809

UNITED STATES PATENT OFFICE

NATHAN A. HALLWOOD, OF COLUMBUS, OHIO

SCALE

Application filed September 27, 1926, Serial No. 137,906. Renewed June 4, 1931.

The present invention relates to weighing scales, and more particularly to scales of the type utilizing a spring or springs as part of the controlling or actuating mechanism thereof, and by means of which movement of the weighing beam from a normal unweighted position is yieldingly resistent, and one of the outstanding objects of the invention resides in the provision of a novel and improved spring mechanism which will serve to maintain the beam constantly in its normal position, when unweighted, irrespective of varying temperature conditions to which the scale is subjected.

It is a well recognized fact that temperature changes unless compensated for, impair the accuracy of scales employing springs as a part of their actuating mechanism. Such springs undergo a change in length for each change in temperature. Such changes in the length of the springs not only alter the tension exerted thereby with respect to a predetermined normal temperature, but also vary the helix angles of the springs and the modulus of elasticity. This change in tension by reason of temperature variations has heretofore been recognized and efforts have been made to negative the effect thereof by utilizing opposing springs having characteristics such that the change in length of the material constituting one spring will be exactly offset or counteracted by the change in length of the material constituting the other spring. By making an attachment to a point common to both springs, this point may be kept constant by reason of the thermometrical balance established by the opposing springs, and the structure may, therefore, be utilized for maintaining a pointer or other indicator on the zero division or reading of the scale.

With structures utilizing opposed springs of the character referred to, having a common point of connection with a weighing beam, I have found that there is no substantial difficulty encountered so long as the temperature variations and the loads imposed on the scale remain relatively small or low. Where, however, such scales are subjected to comparatively greater changes in temperature, and to heavier loads, difficulty is encountered by reason of the changes in the modulus of elasticity and the helix angles of the springs, these changes both being of the opposite order in the respective springs. It will be apparent, therefore, that the use of opposed springs having a common point of attachment to the weighing beam, and whether of the tension or of the compression type, amplify the one difficulty referred to, for the reason that as one spring is acted upon in such manner as to cause it to approach its elastic limit, the other spring is acted upon in such manner that it approaches its resting position.

It is one of the objects of the present invention to provide temperature compensating means for scales embodying springs as a part of the actuating mechanism thereof, the compensating means being of such nature that not only is the index maintained on the zero division of the scale at all times, but the objections heretofore encountered, by reason of the changes in the modulus of elasticity and the helix angle, are substantially obviated.

It is another object of the invention to produce a scale having the weight indicating mechanism mounted in the base housing of the scale, and to enable such weight indicating mechanism to be directly operated by the scale beam, avoiding multiplicity of parts, providing for accuracy in construction, and at the same time enabling the indicating mechanism to be read with ease, accuracy and facility.

With these and other objects in view, as will appear as the description proceeds, the invention consists in the novel features of construction, combinations of elements and arrangements of parts hereinafter to be fully described and pointed out in the appended claims.

In the accompanying drawings:

Figure 1 is a vertical sectional view taken through a scale constructed in accordance with the principles of the invention, Figure 2 is a plan view of the mechanism contained within the base of the scale, the plane of the figure being indicated by the line 2—2 of Figure 1, Figure 3 is a vertical transverse sectional view taken on the line 3—3 of Figure 1, looking in the direction indicated by the arrows, Figure 4 is a similar view on the line 4—4 of Figure 1, looking in the direction indicated by the arrows, Figure 5 is a detail view taken through the auxiliary arm, and illustrating its shiftable link connection with the beam mechanism, Figure 6 is a transverse sectional view taken on the line 6—6 of Figure 5, Figure 7 is a detail vertical sectional view disclosing the link connection between the adjoining ends of the opposed lever elements of the beam mechanism, Figure 8 is a similar view disclosing the connection between the lower end of the tension spring and its associated beam element, and Figure 9 is a detail view showing a slightly modified form of connection between the auxiliary arm and the beam link.

Referring more particularly to the drawings the numeral 1 designates the base of the scale. Arising from the ends of said base are transversely spaced fulcrum posts 2 having their upper ends fitted with fulcrum blocks 3, upon which rest the knife edge trunnions 4 of a pair of beams 5 and 6. Midway of their length the beams are provided with laterally extending knife edge trunnions 7, upon which rest the lower ends of the yoke 8 of a weight receiver 9.

In this form of the invention the receiver 9 comprises a horizontal pan or plate 10, supported by a casting 11 engaging with its under side, the said casting resting upon the upper end of the yoke 8 and is secured thereto by means of a screw 12.

To support the beams 5 and 6, I employ a pair of springs, the purpose of which is explained hereinafter. To this end the base is provided with an upstanding bracket 13 terminating adjacent the top of the housing 14 of the scale. The upper end of the bracket 13 pivotally carries an adjusting lever 15, and to one end of this lever is connected the upper end of a tension spring 16, the latter having its lower end connected with a stirrup 17 carrying opposed bearing blocks 18, which are maintained in engagement with knife edge trunnions 19 carried by the downwardly directed arm 20 of the beam 5. The adjusting lever 15 has its other end extending downwardly and held in various positions of adjustment by means of a set screw 21.

In opposition to the spring 16 the present invention contemplates the provision of a second spring 22, provided with an adjustable stem 23 retained in connection with the base 1. The upper end of the spring 22 is connected with a second stirrup 24, also pivotally connected with the beam 5 by means of knife edge bearings 25 located at the upper end of an upstanding bracket arm 26 forming a part of the beam 5. It will be seen that the tension springs do not have a common point of attachment with the weighing beam, as heretofore has been the practice. Thus, the springs act differently on the beam and not in strict unison due to the fact that the springs are connected with the beam at varying distances with respect to the fulcrum center of said beam.

The beams 5 and 6 are linked together near their free ends by means of a knife edge connection 27, hence the two beams will move in unison with each other about their fulcrums. Connected to the beam 5 is a stem 28 of a dash pot 29, which controls, as usual, the oscillation of the beams.

An important feature of the present invention lies in the provision of a thermostatically controlled indicating mechanism, consisting of a beam 30 pivotally connected at one end to a pair of brackets 31 arising from the base 1, the free end of the beam being provided with an arcuate rack 32 which meshes with a pinion 33 mounted on an indicator shaft 34. The indicator being of the drum type and includes a pair of drum sections 35 and 36, between which the pinion 33 and the rack 32 are positioned.

To effect the oscillation of the indicator controlling beam 30 the free end of the load carrying beam 6 has pivotally connected thereto a link member 37 which in turn is pivoted to a bearing block 38 slidingly connected with the under side of the beam 30 at a spaced point from the fulcrum thereof. The beam being provided on its upper side with a thermostat, in this instance, in the form of a rod 39, made from temperature effective material such as ebonite metal, the free end of which butts against one end of an arm 40 pivotally connected intermediate of its length as at 41 to the beam 30. The lower end of the arm 40 engages the bearing block 38, which is held in firm contact therewith through the action of a spring 42. It will be seen that upon temperature variation, the rod 39 will expand and contract and consequently the bearing block 38 will be shifted longitudinally with respect to the beam toward and away from its fulcrum center. Thus, for example, if the temperature increases from a normal the springs 16 and 22 have a tendency to expand and thus do not apply normal tension to the load receiving beams. However, by the provision of the thermostat 39 the bearing block 38 is moved away from the fulcrum center of the beam 30 so that the latter will describe a less arc, which results in less movement on the part of the indication drum thus maintaining a correct indication reading throughout all temperature variations.

It will be noted that the indicator drum is located in the housing 14 of the scale and below the plane of the weight receiver 9. The housing 14 is provided with sight openings 43, which are so arranged and set at such angle that the indicator may be read correctly and conveniently from either side of the housing by persons of varying height. The opening 43 nearest the weight receiver of the scale is set at an angle approximately 45° with respect to the horizontal and the opening opposite thereto, which is on the merchant's or scale operator's side of the scale, is set at an angle approximately 60° with respect to the horizontal line taken through the drum axis. Setting the openings at these respective angles is important in that it permits both the merchant and customer to view the indicating drum properly, the sight opening for the scale operator being, of course, located higher due to the fact that he will be nearest to the indicating drum whereas the customer is farther away from said lens and therefore the sight opening must be lowered in order to be clearly visible. The scale housing may be provided near its top with a flange 44 which rests upon the marginal edges of an opening 45 formed in a counter 46, so that the greater portion of the housing will be hidden from view. In this method of support a neat and attractive appearance is effected as well as having the scale in an easily accessible weighing position.

In view of the foregoing it will be seen that the present invention provides a scale wherein is included a novel combination of springs so mounted in connection with a cooperating beam as to establish what may be termed a thermostatic balance, and so related to the beam that objections heretofore encountered, by reason of changes in the helix angles and the modulus of elasticity with respect to said springs are substantially obviated. A considerable refinement is introduced and greater accuracy obtained through the use of the automatic thermostatic means which, after the springs have been properly set in a given operating position, will compensate for variations in temperature in a purely automatic manner, maintaining the weight indicating means, when the scale is unweighted, exactly on the zero division throughout a wide temperature range. Invention is not limited, of course, to the precise form illustrated and described but may be embodied in other widely varying forms of mechanism. For example, the springs may be mounted to act in connection with a compound beam in lieu of the simple lever type of beam disclosed, and other similar changes may be made, too numerous to detail herein, without departing from the scope of the following claims.

For example, in Figure 9 the thermostatic bar 39 presses against a lever 40a by the action of a spring 42a, and the link 37 is pivotally connected as at 37a to the lower end of the lever 40a, whereby the same function is accomplished as is secured by the sliding block 38.

What is claimed is:

1. In a scale, a base, a weighing beam pivotally mounted in connection with the base, a weight receiver pivotally supported in connection with said beam, a pair of springs having certain of the ends thereof connected with said base and their other ends connected with said beam, the points of connection of said springs with said beam being disposed at unequal distances from the point of pivotal connection of said beam with said base, an auxiliary arm pivotally mounted in connection with said base, means for oscillating said arm in unison with said beam, and an indicating mechanism operated by the movements of said arm.

2. In a scale, a base, a pivotally mounted beam structure carried by said base, oppositely acting tension springs carried in connection with said base and connected with said beam structure to maintain the latter normally in a given position, a pivotally mounted arm carried by said base and coextensive with respect to said beam structure, a link connection between said arm and said beam structure, an indicating drum, and means carried by the free end of said arm for rotating said drum.

3. In a scale, a base, a beam structure comprising a pair of levers pivotally supported at their outer ends upon said base, a weight receiver pivotally supported on said lever elements, oppositely acting springs connected with at least one of said lever elements and serving to maintain the latter in normal position, an auxiliary arm pivotally mounted at one end in connection with said base, a link connection between one of said lever elements and said arm, and an indicating mechanism actuated by the movements of said arm.

4. In a scale, a base, a beam pivotally supported on said base, a pair of opposed tension springs, the outer ends of said springs being connected with said base and the inner ends of said springs being connected by pivoted bearings disposed in longitudinally spaced relation on said beam, an arm pivoted to said base and coextensive with said beam, a link connection between said beam and said arm, a rotatable indicating drum, and means for rotating said drum by the movements of said arm.

5. In a scale, a base, a pair of longitudinally extending lever elements comprising a beam structure, said lever elements being pivotally supported at their outer ends, a weight receiver pivotally supported in connection with said lever elements, a pair of opposed tension springs having certain of the ends thereof connected with said lever elements to yieldably support said weight receiver, a pivotally mounted arm coextensive with said lever elements, a link connection between said lever elements and said arm, and motion transmitting appliances carried by the outer end of said arm for actuating an indicating means.

6. In a scale, a base, a pivoted weighing beam carried by said base, a weight receiver supported by said beam, a pair of opposed tension springs connected with said beam at unequal distances from the point of pivotal support thereof, an arm coextensive with said beam and having one end thereof pivotally mounted, a weight indicating means actuated by the free end of said arm, and an adjustable connection between said beam and said arm.

7. In a scale, a pivotally mounted beam structure, a weight receiver including a depending stem terminated in a yoke, pivotal bearings between said yoke and said beam structure, oppositely acting springs operating on said beam structure to maintain the same in a normal weighting position, said springs being spaced longitudinally, a pivoted arm arranged contiguous to said beam structure, means for oscillating said arm in unison with said beam structure, and an indicating means operated by the movements of said arm.

8. In a scale, a pivotally mounted beam structure, a weight receiver pivotally supported upon said beam structure, longitudinally spaced opposed springs connected with said beam structure and serving to maintain the same in a normal weighing position, a pivoted member arranged adjacent to said beam structure, means for oscillating said member in unison with said beam structure, an indicating mechanism operated by the movements of said member, and thermostatically responsive means for varying the throw of said member in relation to given movements on the part of said beam structure.

9. In a scale, a pivotally mounted beam, opposed longitudinally spaced springs connected with said beam and serving to maintain the latter in a normal weighing position, a pivoted arm arranged contiguous to said beam, a link connection between said beam and said arm, thermostatic means for shifting said link connection relative to said arm, and an indicating means operated by the free end of said arm.

10. In a scale, a pivoted weighing beam, opposed longitudinally spaced springs connected with said beam for maintaining the latter normally in a given weighing position, a pivoted arm arranged adjacent to said beam, a link connection between said beam and said arm, a thermostatic member carried by said arm for varying the effective positions of said link connection with respect to said arm, and an indicating mechanism operated by the movement of the free end of said arm.

11. In a scale, a base, a weighing beam pivoted on said base, spring means connected with said beam for maintaining the latter in a normal weighing position, a weight support carried by said beam, a housing for said scale connected with said base and arranged in a plane below said weight support, an indicating drum mounted within the confines of said housing and actuated by the movements of said beam, a reading means formed with said housing to permit of the reading of said drum on opposite sides of said housing, said reading means being disposed below said weight receiver.

12. In a scale, a base, a weighing beam pivotally supported upon said base, means tending to maintain said beam in a normal weighing position and to yieldingly resist movement of said beam from said position, a pivotally mounted arm carried by said base contiguous to said beam, a link connection between said beam and said arm, a thermostatic rod carried by said arm, means actuated by variations in the length of said arm in response to fluctuating temperatures to vary the effective positions of said link in relation to said arm, a rack carried by the outer end of said arm, and an indicating means including a pinion arranged in engagement with said rack.

13. In a scale, a housing formed to include a flange arranged to rest upon an associated support, a weighing mechanism suspended from said housing and disposed below said flange, a weight receiver arranged in a plane above said housing and support, and an indicating drum mounted below the top of said housing and having a portion thereof extending in a plane above said support.

14. In a scale, a housing, a flange formed on said housing near the top thereof and arranged to rest upon the marginal edges of an opening formed in an associated support, the top of said housing lying in a plane substantially with the top of said support, a weighing mechanism suspended from said housing, a weight receiver disposed in a plane above said housing, an indicating drum and its actuated mechanism arranged below the top of said housing, and reading means for said indicating mechanism formed in connection with the top of said housing and disposed below said weight receiver.

15. In a scale mechanism, the combination with an associated support having an opening formed therein, a scale housing having a flange arranged to rest upon the marginal edges of said opening so as to cover the latter, the top of said housing and support lying in substantially the same plane, a weighing mechanism suspended from the top of said housing, a weight support arranged above said housing and including a depending stem having connection with said weighing mechanism, an indicating drum located within said housing and having a portion thereof positioned within a chamber formed in the top of said housing, said chamber being disposed above said housing and support, drum reading means arranged in the walls of said chamber and upon opposite sides of the latter, said reading means being disposed in a plane below the weight receiver.

16. In a scale, the combination with a support having an opening formed therein, a cover for said opening arranged to rest upon the marginal edges of said opening, a scale mechanism suspended from said cover, a stem arising from said mechanism and extending through an opening formed in said cover, a weight platter positioned upon the upper end of said stem and arranged above said cover, said cover being formed with an open bottomed chamber, an indicating drum arranged below and extending into said chamber, the walls of said chamber conforming in curvature to said drum, and sight openings formed in the walls of said chamber.

17. In a scale, a base having at one end spaced fulcrum supports, a beam pivoted on said fulcrum supports, a weight receiver carried by said beam, an indicating drum mounted at one end of said base and between said fulcrum supports and to one side of the vertical axis of said load receiver, and means for actuating said drum in accordance with the movement of said beam.

18. In a scale, the combination with an associated support having an opening formed therein, a cover for said opening arranged to engage the edge thereof and occupying substantially the same plane as the top of said support, a weighing mechanism supported below said cover, said mechanism including a stem extending through an opening formed in said cover, a weight platter on said stem, and an indicating drum located below said cover and having a portion thereof arranged adjacent a sight opening formed in said cover, said sight opening being arranged to one side of said platter.

19. In a weighing scale, a base, a weighing mechanism on said base, a weight receiver carried by said mechanism, an indicating drum on said base and having its longitudinal axis to one side of the vertical axis of said weight receiver with the latter located intermediate the ends thereof, and means for actuating said drum in accordance with the movement of said mechanism.

20. In a weighing scale, a base, a movable beam, a weight receiver supported by said beam, an indicating drum mounted for rotation on said base and arranged at one end of said beam and to one side of said weight receiver, and a housing mounted on said base and arranged to cover both the drum and beam.

21. In a weighing scale, a housing including a drum chamber, a drum rotatably mounted in said chamber, a weight receiver located above said housing and positioned with its vertical axis to one side of said drum, and drum reading means arranged in the top of said housing upon opposite sides of said drum chamber and below said weight receiver, the said reading means farthest from said weight receiver being that of the scale operator.

22. In a weighing scale, a housing including a drum chamber, a computing drum rotatably mounted in said chamber, a weight receiver arising from said housing and positioned with its vertical axis to one side of said drum, said weight receiver being in a plane above said drum, and drum reading means arranged in the top of said housing upon opposite sides of said drum chamber of which the scale operator's reading means is on the side farthest from the weight receiver.

23. In a weighing scale, a housing, a horizontally arranged drum rotatably mounted in said housing, a weight receiver arising from the top of said housing and to one side of said drum, the platter of said weight receiver being in a substantially horizontal plane above that of said drum, and drum reading means arranged in the top of said housing upon opposite sides of said drum of which reading means the customer's is on the side nearest the weight receiver and lying in a plane below said platter and viewable on either side of the latter.

24. In a weighing scale, a base, a weighing mechanism in connection with said base, a weight receiver carried by said mechanism, an indicating drum on said base and located to one side of said weight receiver, and scale operator's reading means for said drum arranged on the side of the latter farthest away from said weight receiver.

25. In a scale, a housing including a drum chamber, a drum rotatably mounted in said chamber, a weight receiver located above said housing and positioned with its vertical axis to one side of said drum, and drum reading means arranged in the top of said housing upon opposite sides of said drum chamber and below said weight receiver, the reading means located farthest away from said weight receiver being arranged in a horizontal plane above that of the other of said reading means.

26. In a scale, a housing including a drum chamber, a drum rotatably mounted in said chamber, a weight receiver located above said housing and positioned with its vertical axis to one side of said drum, and drum reading means arranged in the top of said housing upon opposite sides of said drum chamber and below said weight receiver, the reading means located farthest away from said weight receiver being at an angle approximately 60° from the horizontal axis of said drum.

27. In a scale, a housing including a drum chamber, a drum rotatably mounted in said chamber, a weight receiver located above said housing and positioned with its vertical axis to one side of said drum, and drum reading means arranged in the top of said housing upon opposite sides of said drum chamber and below said weight receiver, the reading means located closest to the weight receiver being at an angle approximately 45° from the horizontal axis of said drum.

28. In a scale, a housing including a drum chamber, a drum rotatably mounted in said chamber, a weight receiver located above said housing and positioned with its vertical axis to one side of said drum, and drum reading means arranged in the top of said housing upon opposite sides of said drum chamber and below said weight receiver, the reading means located farthest away from said weight receiver being at an angle approximately 60° and reading means closest to said weight receiver approximately 45° from the horizontal axis of said drum.

29. In a weighing scale, a housing including a drum chamber, a drum rotatably mounted in said chamber, a weight receiver located above said housing and positioned with its vertical axis to one side of said drum, said weight receiver being in a plane above said drum, and drum reading means arranged in the wall of said drum chamber and arranged on the side farthest from the weight receiver.

30. In a weighing scale, a housing including a drum chamber, a drum rotatably mounted in said chamber, a weight receiver located above said housing and positioned with its vertical axis to one side of the drum and intermediate the ends thereof, said weight receiver being in a plane above said drum, and reading means arranged in the wall of said drum chamber and located beyond the edge of said weight receiver.

31. In a weighing scale, a housing including a drum chamber, a drum rotatably mounted in said chamber, a weight receiver located above said housing and positioned with its vertical axis to one side of the drum and intermediate the ends thereof, said weight receiver being in a plane above said drum and extending over the latter, and reading means arranged in the wall of said drum chamber and located beyond the edge of said weight receiver.

32. In a weighing scale, a base, an indicating drum mounted on said base, a weighing mechanism on said base and arranged to one side of the longitudinal axis of said drum intermediate the ends thereof, and a weight receiver arising from said mechanism and having its vertical axis located to one side of the longitudinal axis of said drum and arranged intermediate the ends thereof.

In testimony whereof I affix my signature.

NATHAN A. HALLWOOD.